(12) United States Patent
Nam et al.

(10) Patent No.: US 9,180,432 B2
(45) Date of Patent: Nov. 10, 2015

(54) NOX STORAGE AND REDUCTION CATALYST, PREPARATION METHOD, AND NOX REMOVING SYSTEM

(71) Applicants: Hyundai Motor Company, Seoul (KR); Kia Motors Corporation, Seoul (KR)

(72) Inventors: In-Sik Nam, Pohang-si (KR); Sang Jun Park, Gimhae-si (KR); Jin Ha Lee, Seoul (KR); Youngkee Youn, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/199,872

(22) Filed: Mar. 6, 2014

(65) Prior Publication Data

US 2014/0186226 A1 Jul. 3, 2014

Related U.S. Application Data

(62) Division of application No. 12/957,985, filed on Dec. 1, 2010, now Pat. No. 8,735,318.

(30) Foreign Application Priority Data

Aug. 11, 2010 (KR) .......................... 10-2010-0077506

(51) Int. Cl.
*B01J 23/02* (2006.01)
*B01J 23/04* (2006.01)
(Continued)

(52) U.S. Cl.
CPC .............. *B01J 23/58* (2013.01); *B01D 53/9422* (2013.01); *B01J 23/005* (2013.01); *B01J 23/007* (2013.01);
(Continued)

(58) Field of Classification Search
CPC ............ B01J 23/02; B01J 23/04; B01J 23/38; B01J 23/54; B01J 23/78; B01J 2531/10; B01J 2531/11; B01J 2531/12; B01J 2531/13; B01J 2531/14; B01J 2331/20; B01J 2531/22; B01J 2531/23; B01J 2531/24; B01J 2531/25; B01D 53/02; B01D 53/56; B01D 53/86; B01D 53/8628

USPC ......... 502/327, 103, 325, 330, 332–334, 340, 502/341, 344, 355; 423/239.1, 239.2; 422/177, 182; 95/129; 96/108, 109
IPC ............ B01J 23/02,23/04, 23/38, 23/54, 23/78, B01J 2531/10, 2531/11, 2531/12, 2531/13, B01J 2531/14, 2331/20, 2531/22, 2531/23, B01J 2531/24, 2531/25; B01D 53/02, 53/56, B01D 53/86, 53/8628
See application file for complete search history.

(56) References Cited

U.S. PATENT DOCUMENTS 6,313,063 B1 11/2001 Rytter et al.
6,419,890 B1 7/2002 Li
(Continued)

FOREIGN PATENT DOCUMENTS

CN 1806912 A 7/2006
EP 1 316 354 A1 6/2003
(Continued)

OTHER PUBLICATIONS

L. Obalová et al., "Effect of potassium in calcined Co-Mn-Al layered double hydroxide on the catalytic decomposition of $N_2O$," Applied Catalysis B: Environmental 90 (2009), pp. 132-140.
(Continued)

*Primary Examiner* — Patricia L Hailey
(74) *Attorney, Agent, or Firm* — Morgan, Lewis & Bockius LLP (57) ABSTRACT

A catalyst for NOx storage and reduction may include a carrier that contains alkali metal and Al, or alkali earth metal and Al, a NOx storage element of alkali metal, alkali earth metal or rare earth element, and one or more noble metals that are selected from the group consisting of Pt, Pd, Ru, Ag, Au and Rh. The catalyst for NOx storage and reduction shows excellent NOx storage and reduction capability, maintains excellent storage and reduction capability especially before and after deterioration and sulfation, and shows excellent catalytic activity under low temperature environment, while maintaining unusually high hydrophobicity.

4 Claims, 5 Drawing Sheets

(51) Int. Cl.
| | |
|---|---|
| B01J 23/38 | (2006.01) |
| B01J 23/54 | (2006.01) |
| B01J 23/78 | (2006.01) |
| B01D 53/02 | (2006.01) |
| B01D 53/56 | (2006.01) |
| B01D 53/86 | (2006.01) |
| B01J 23/58 | (2006.01) |
| B01D 53/94 | (2006.01) |
| B01J 23/00 | (2006.01) |
| B01J 23/66 | (2006.01) |
| B01J 29/06 | (2006.01) |
| B01J 37/03 | (2006.01) |
| F01N 3/20 | (2006.01) |
| F01N 3/08 | (2006.01) |

(52) U.S. Cl.
CPC .... *B01J 23/66* (2013.01); *B01J 29/06* (2013.01); *B01J 37/031* (2013.01); *F01N 3/0842* (2013.01); *F01N 3/208* (2013.01); *B01D 53/9477* (2013.01); *B01D 2255/1021* (2013.01); *B01D 2255/1023* (2013.01); *B01D 2255/2022* (2013.01); *B01D 2255/2025* (2013.01); *B01D 2255/2047* (2013.01); *B01D 2255/2092* (2013.01); *B01D 2255/91* (2013.01); *F01N 3/0821* (2013.01); *F01N 3/0871* (2013.01); *F01N 2610/03* (2013.01)

(56) References Cited

U.S. PATENT DOCUMENTS

| | | | |
|---|---|---|---|
| 6,858,193 B2 | 2/2005 | Ruwisch et al. | |
| 6,967,182 B1 | 11/2005 | Olsbye et al. | |
| 7,189,376 B2* | 3/2007 | Kumar et al. | 422/177 |
| 7,449,425 B2 | 11/2008 | Wang et al. | |
| 7,740,818 B2 | 6/2010 | Han et al. | |
| 7,767,175 B2* | 8/2010 | Golden et al. | 423/213.2 |
| 8,735,318 B2* | 5/2014 | Nam et al. | 502/327 |
| 2003/0108465 A1* | 6/2003 | Voss et al. | 423/213.2 |
| 2003/0125202 A1 | 7/2003 | Ruwisch et al. | |

FOREIGN PATENT DOCUMENTS

| | | |
|---|---|---|
| JP | 7-16466 A | 1/1995 |
| JP | 7-75735 A | 3/1995 |
| JP | 7-88371 A | 4/1995 |
| JP | 10-249199 A | 9/1998 |
| JP | 2000-202289 A | 7/2000 |
| JP | 2001-59413 A | 3/2001 |
| JP | 2002-213232 A | 7/2002 |
| JP | 2003-299961 A | 10/2003 |
| JP | 2007-530271 A | 11/2007 |
| JP | 2009-226349 A | 10/2009 |
| JP | 2011-52680 A | 3/2011 |
| KR | 10-0836367 B1 | 6/2008 |
| TW | 200824782 A | 5/1996 |
| WO | WO 02/47729 A2 | 6/2002 |
| WO | WO 2005/092481 A1 | 10/2005 |
| WO | WO 2007/136148 A1 | 11/2007 |

OTHER PUBLICATIONS

Park et al., "Hydrotalcite as a Support for NOx Trap Catalyst," Springer Science+Business Media, LLC 2009, Dec. 22, 2009, 53:57-63.

Toops et al. "NOx adsorption on Pt/K/Al$_2$O$_3$," Catalysis Today 114 (2006), pp. 112-124.

Toops et al. "Quantified NOx adsorption on Pt/K/gamma-Al$_2$O$_3$ and the effects of CO$_2$ and H$_2$O," Applied Catalysis B: Environmental 58 (2005), pp. 255-264.

Yu et al. "NOx decomposition, storage and reduction over novel mixed oxide catalysts derived from hydrotalcite-like compounds," Journal of Colloid and Interface Science 333 (2009), pp. 423-430.

* cited by examiner

NOX STORAGE AND REDUCTION CATALYST, PREPARATION METHOD, AND NOX REMOVING SYSTEM

CROSS-REFERENCE TO RELATED APPLICATION

This application is a Divisional of U.S. patent application Ser. No. 12/957,985, filed Dec. 1, 2010, which claims priority to and the benefit of Korean Patent Application No. 10-2010-0077506 filed in the Korean Intellectual Property Office on Aug. 11, 2010, the entire contents of which applications are incorporated herein for all purposes by this reference.

BACKGROUND OF THE INVENTION

1. Field of the Invention

The present invention relates to a catalyst for NOx storage and reduction, a preparation method thereof and a NOx removing system including the catalyst for NOx storage and reduction.

2. Description of the Related Art

NOx is a representative harmful exhaust gas that is emitted from vehicles equipped with the internal combustion engine, and it includes nitric oxide (NO) and nitrogen dioxide ($NO_2$). It is known that NOx causes pulmonary emphysema, bronchitis and the like that are respiratory diseases, and generates ozone that causes smog by photochemical reactions. In recent years, lean-burn engines have been actively developed in order to improve the energy efficiency of the internal combustion engine, thereby lowering $CO_2$ emissions. However, it has been widely recognized that the NOx exhaust from the lean-burn engine is very difficult to remove using the existing three-way catalyst, because of the highly oxidizing environment in the lean-burn engine exhaust due to excess oxygen.

In order to solve health and environmental problems caused by NOx, Europe enacted or proposed regulations such as EURO 3, EURO 4, EURO 5 and current EURO 6. In order to lower the exhaust amount of NOx that is difficult to remove using a known catalyst while the regulation of the vehicle exhaust gas becomes stringent, the vehicle manufacturing industry has been focusing on the development of new engine technologies as well as exhaust after-treatment technologies for cleaner tailpipe emissions.

Among these new technology developments, interests on the development of the NOx storage and reduction catalysts in particular have been growing recently. A NOx removing technology using the NOx storage and reduction catalyst adsorbs NOx under oxygen-rich exhaust gas condition, and reduces it into innocuous gases such as nitrogen and carbon dioxide under hydrocarbon-rich exhaust gas condition.

The catalyst for NOx storage and reduction technology may be normally operated under the lean-burn condition, using the existing exhaust devices without any modifications. Thus, this technology draws special attention from the vehicle manufacturing industry, because it can meet the stringent emission regulations such as EURO 6 without additional infrastructure installation costs.

As a representative storage-reduction catalyst, there may be a catalyst for NOx storage and reduction that includes alumina as a carrier, Ba as a storage material, and a noble metal such as Pt as a NOx reduction catalyst. With the development of the above catalysts, a technology of the NOx storage and reduction has been developed, but in the case of the proposed catalyst for NOx storage and reduction, it has problems in that before and after deterioration and sulfation, there are low storage and reduction activity.

Particularly, development of a catalyst is urgently needed, which does not deteriorate while maintaining its excellent NOx storage and reduction capabilities under the low compression ratio environment and low temperature of around 200° C.

Therefore, inventors of the present invention have extensively investigated a catalyst that has excellent NOx storage and reduction activities before and after deterioration/sulfation, and improved activity, in particular, under the low temperature environment of around 200° C., thereby accomplishing the present invention.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Various aspects of the present invention provide for a catalyst for NOx storage and reduction and a preparation method thereof, in which the catalyst for NOx storage and reduction shows excellent NOx storage and reduction capability before and after deterioration and sulfation, and improved activity, in particular, under low temperature environment.

Further, various aspects of the present invention provide for a NOx removing system that includes the catalyst for NOx storage and reduction.

One aspect of the present invention provides a catalyst for NOx storage and reduction and a preparation method thereof, in which the catalyst for NOx storage and reduction shows excellent NOx storage and reduction capability before and after deterioration and sulfation, and improved activity, in particular, under low temperature environment.

Another aspect of the present invention provides a NOx removing system that includes the catalyst for NOx storage and reduction and removes NOx that is included in exhaust gas by using a exhaust device that is installed in a exhaust pipe.

Hereinafter, a catalyst for NOx storage and reduction according to various aspects of the present invention, a preparation method thereof and a NOx removing system that includes the same will be described in detail.

The catalyst for NOx storage and reduction (hereinafter, referred to as "NSR catalyst") according to various aspects of the present invention includes a carrier having alkali metal and Al, or alkali earth metal and Al, a NOx storage element of alkali metal, alkali earth metal or rare earth element, and one or more noble metals that are selected from the group consisting of Pt, Pd, Ru, Ag, Au and Rh.

Inventors of the present invention have found that the NSR catalyst that includes the carriers such as alkali metal and Al or alkali earth metal and Al has excellent NOx storage and reduction capability before and after deterioration and sulfation, and improved activity, in particular, under low temperature environment of around 200° C. as compared to a known NSR catalyst that includes a carrier of metal oxide such as alumina or silica, thereby accomplishing the present invention.

Figure 1:
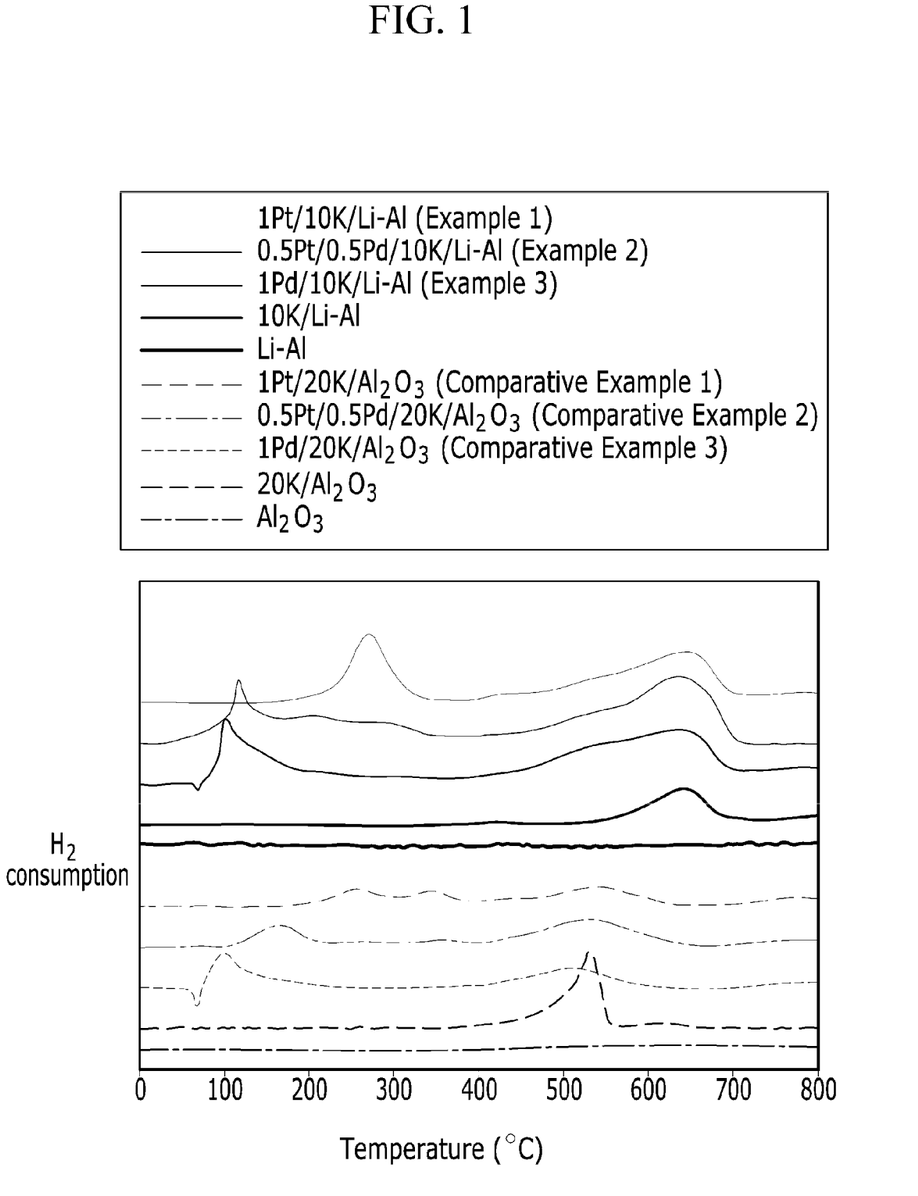
FIG. 1 illustrates temperature programmed reduction (TPR) data that is obtained by comparing the reduction of an exemplary NOx storage-reduction catalyst according to the present invention and that of a NOx storage-reduction catalyst in which alumina is used in the carrier of Comparative Example.

In detail, FIG. 1 illustrates temperature programmed reduction (TPR) characteristic analysis data that is obtained by comparing NOx reduction abilities of a NSR catalyst that is representatively used as the NSR catalyst and includes Pt, Pd, or Pt and Pd (reduction catalyst)/K (NOx storage element)/alumina and the NSR catalyst that includes the carrier containing alkali metal and Al according to various aspects of the present invention. As shown in FIG. 1, it can be seen that an exemplary NSR catalyst according to the present invention shows excellent NOx reduction activity in a low temperature region of around 200° C. as compared to a known used NSR catalyst.

Meanwhile, in order to be used as the NSR catalyst, in addition to the reduction activity of NOx, activities such as adsorption activity and reduction activity of NOx after the sulfation should be excellently maintained. In the case of the known NSR catalyst, there are problems in that NOx adsorption activity and reduction activity are deteriorated by sulfur poisoning.

Figure 2:
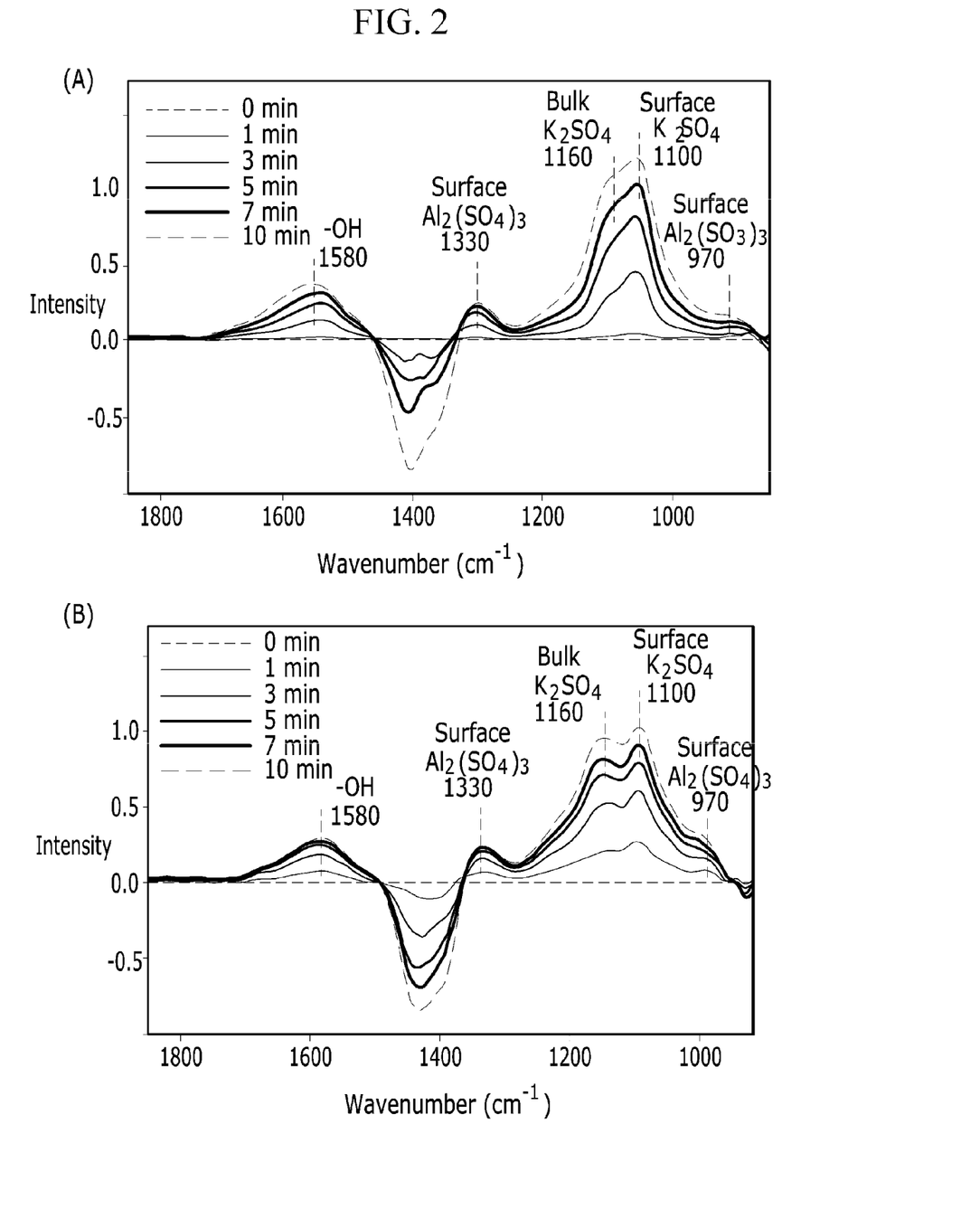
FIG. 2 illustrates comparison of $SO_2$ adsorption capabilities of the exemplary catalyst (a) for NOx storage and reduction according to the present invention and the catalyst (b) that includes alumina as the carrier according to Comparative Example.

However, as shown in FIG. 2, it was confirmed that an exemplary NSR catalyst according to the present invention has a low poisoning speed by a sulfur compound as compared to the NSR catalyst that includes alumina as the carrier. FIG. 2 will be described in more detail below, but in the condition that includes water, is shown by confirming the sulfur compound generated while $SO_2$ is adsorbed onto the NSR catalyst that includes Li and Al as the carrier and the known NSR catalyst that includes alumina as the carrier. That is, in the case of the NSR catalyst according to various aspects of the present invention, it can be seen that as compared to the known NSR catalyst that includes alumina as the carrier, the poisoning rate of the sulfur compound on the surface of the catalyst of this invention is slow.

Figure 3A:
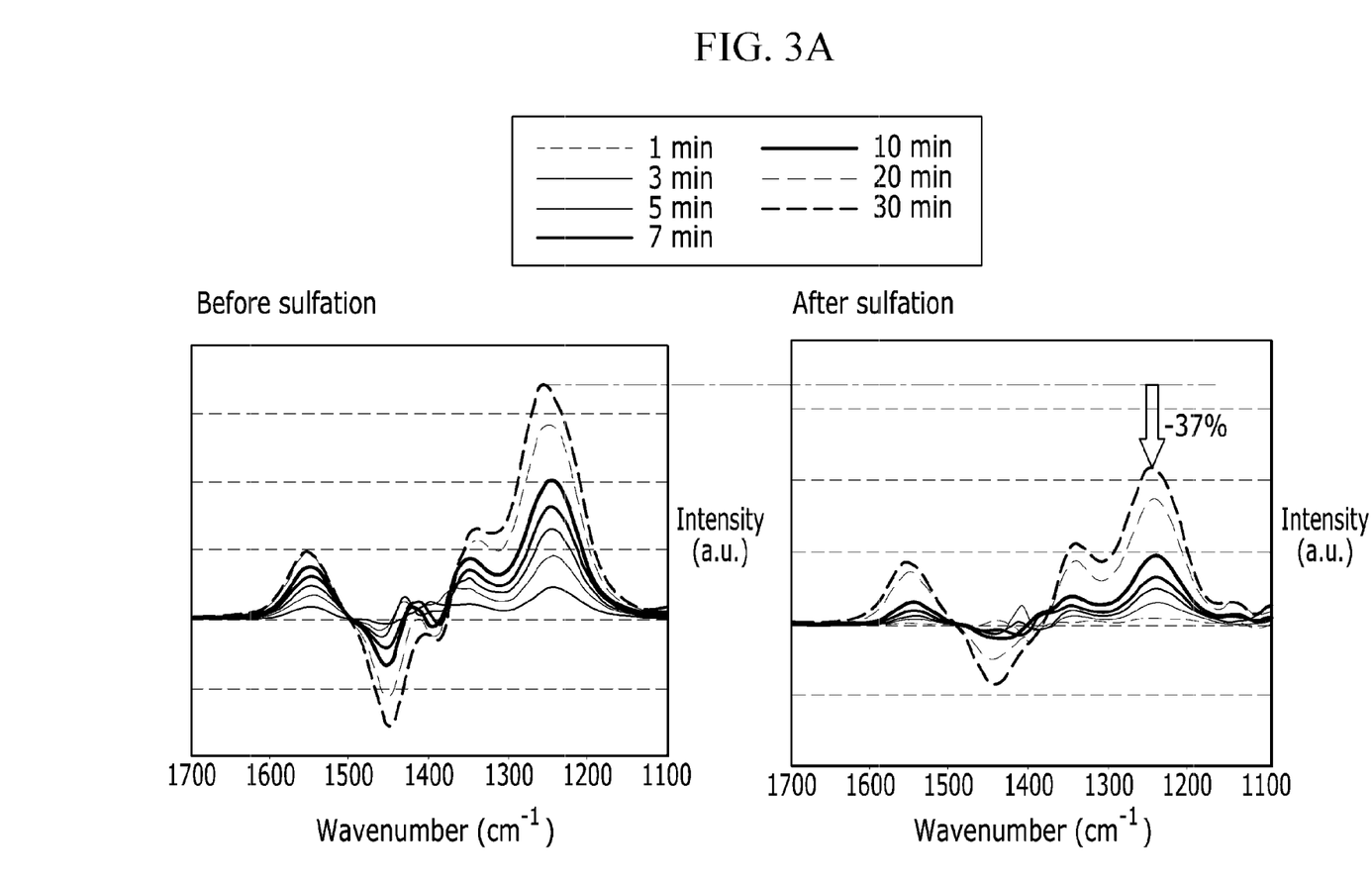
FIG. 3 illustrates comparison of reduction degrees of NOx adsorption amount before and after sulfation of the exemplary catalyst (a) for NOx storage and reduction according to the present invention and the catalyst (b) that includes alumina as the carrier according to Comparative Example.
Figure 3B:
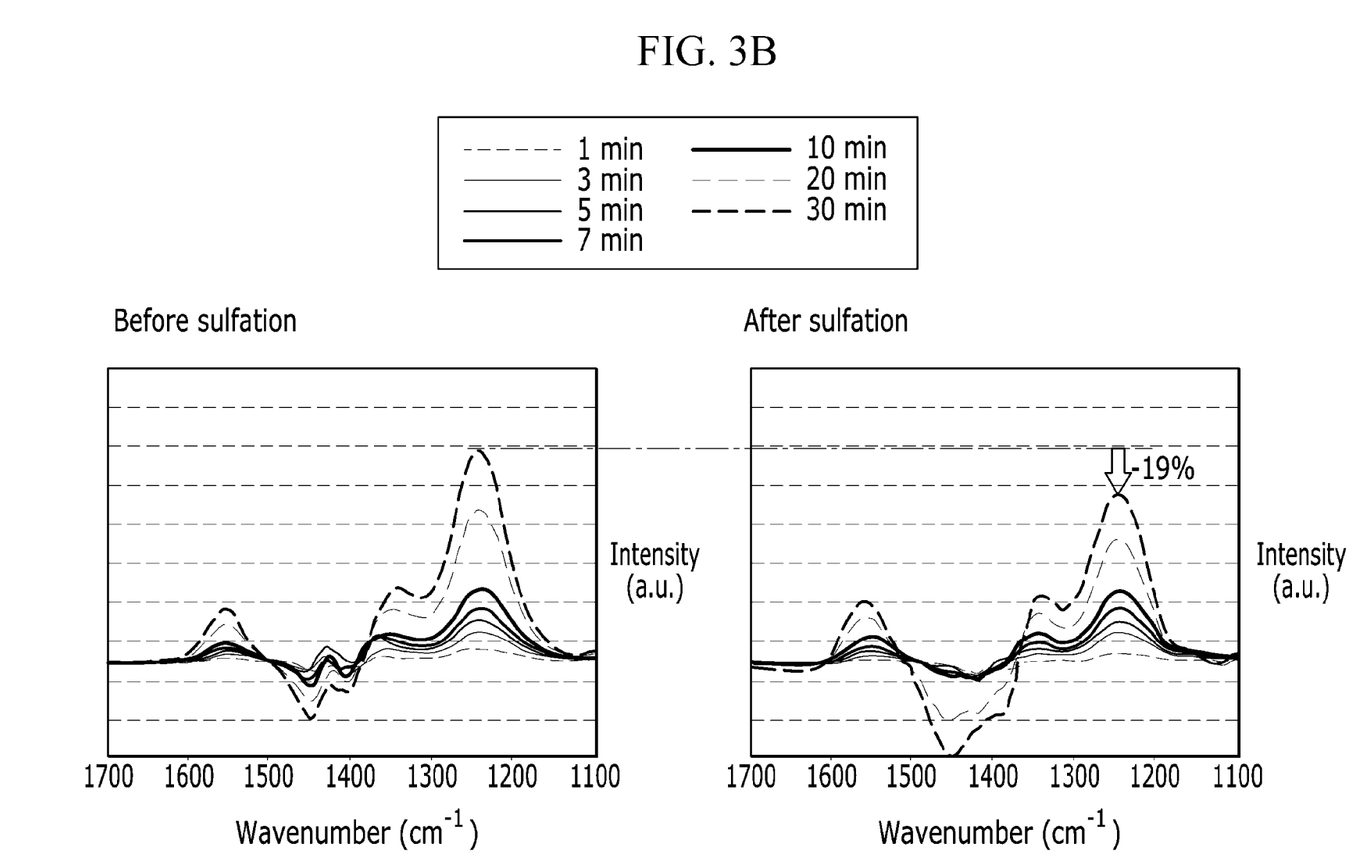

Meanwhile, in relation to the poisoning speed of the sulfur compound, the comparison for reduction degree of NOx adsorption amount before and after the sulfation reaction of the NSR catalyst at a low temperature is illustrated in FIG. 3. As shown in FIG. 3, in the case of an exemplary NSR catalyst according to the present invention, while the deterioration of the NOx adsorption ability after the sulfation is 19%, in the case of the known NSR catalyst that includes alumina as the carrier, the deterioration of the NOx adsorption ability after the sulfation is high, 37%.

Figure 4:
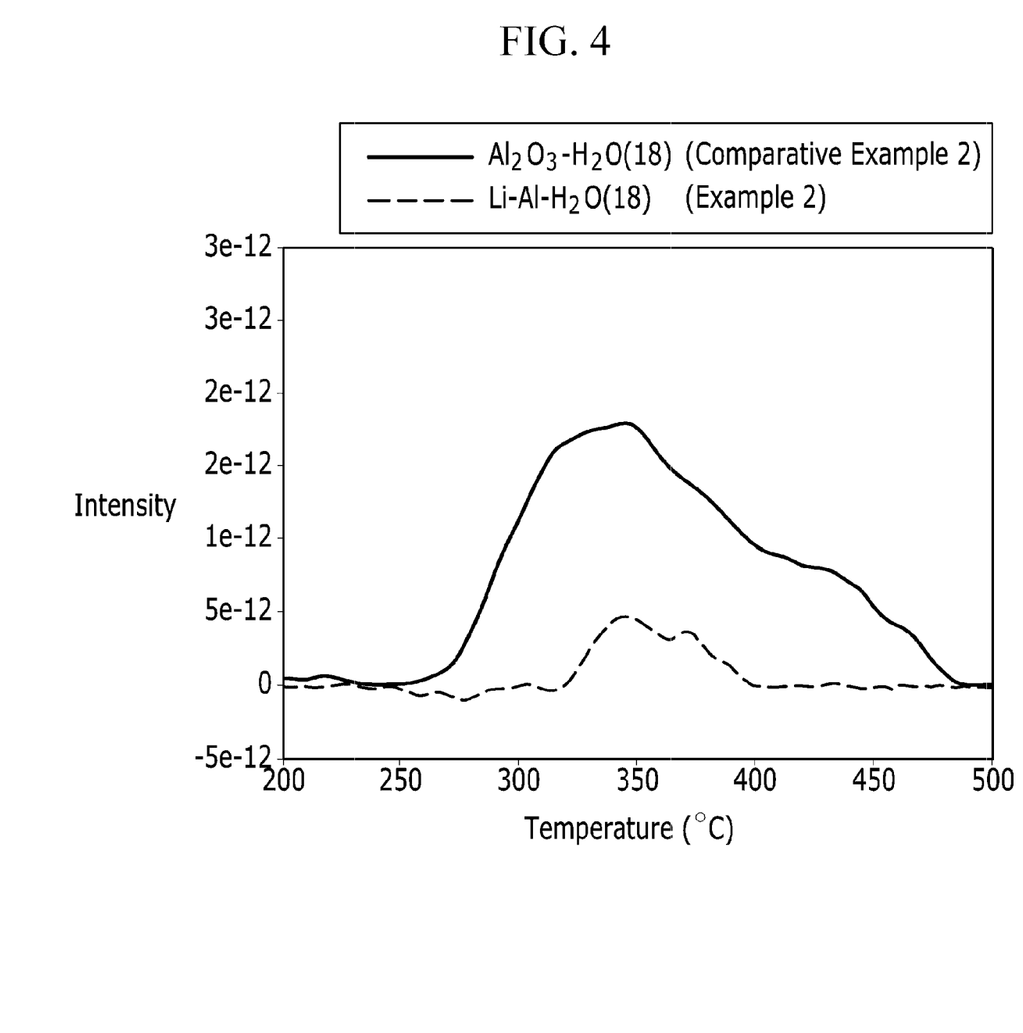
FIG. 4 illustrates comparison of temperature programmed desorption (TPD) results for hydrophilicity and hydrophobicity test of the exemplary NOx storage-reduction catalyst surface according to the present invention and the catalyst surface that includes alumina as the carrier according to Comparative Example.

Finally, FIG. 4 illustrates $H_2O$ TPD test results of an exemplary NSR catalyst according to the present invention and the NSR catalyst that includes alumina as the carrier according to Comparative Example. From the result of FIG. 4, as described above, it can be seen that in the case of the NSR catalyst that includes alkali metal and Al as the carrier, resistance to sulfur may be shown because of the hydrophobicity, in the case of the known NSR catalyst that includes alumina as the carrier, hydrophilicity is shown, and resistance to sulfur is lowered.

Meanwhile, if the carrier of the NSR catalyst that shows the above excellent performance includes alkali metal and Al, or alkali earth metal and Al, there is no limit in a configuration thereof, but in order to ensure more excellent resistance to sulfur and excellent reduction ability at the low temperature, it may include a carrier having Li and Al, and the carrier that includes Mg and Al.

In addition, the NOx storage element of the NSR catalyst according to various aspects of the present invention may be used without a limit of configuration as long as it is used as the storage element of the known catalyst for NOx storage and reduction. In detail, the NOx storage element may be one or more that is selected from the group consisting of K, Ba, Na, Sr, Mg and Ca, but is not limited thereto.

In addition, the carrier of the NSR catalyst according to the present invention may be a layered double hydroxides structure that is represented by the following Formula.

$$[Z-Al_2(OH)_6]X \cdot yH_2O(LiAl_2\text{-}X)] \quad \text{Eq. (1)}$$

In the Formula, Z is Li, Na, K, Rb, Cs, Fr, Be, Mg, Ca, Sr, Ba, or Ra, X is $Cl^-$, $Br^-$, $NO^{3-}$, $CO^{2-}{}_3$ or $SO^{2-}{}_4$, and y is a rational number in the range of 0.5 to 4.

In the case of when the carrier that shows the layered double hydroxides structure that is represented by the above Formula is used, the activity of the catalyst is improved at the low temperature and excellent resistance to sulfur is shown. Meanwhile, the catalyst according to various aspects of the present invention, may include a carrier that includes Li and Al, K as a storage element, and Pt and Pd as the NOx reduction catalyst. In addition, in the NSR catalyst according to the present invention, the configuration of the mass of the carrier, storage element and NOx reduction catalyst is not limited, but in order to optimize the activity of the catalyst, the carrier may be included in the amount of 65 to 95 wt % of the catalyst entire weight, the NOx storage element may be included in the amount of 4.5 to 35 wt %, the noble metal may be included in the amount of 0.2 to 3 wt %. More preferably, the carrier may be included in the amount of 80 to 90 wt % of the catalyst entire weight, the NOx storage element may be included in the amount of 10 to 15 wt %, and the a noble metal may be included in the amount of 0.5 to 1.5 wt %.

In addition, other aspects of the present invention provide a preparation method of the NSR catalyst including dissolving hydroxides of alkali metal or hydroxides of alkali earth metal, aluminum nitrates with carbonates in an aqueous solution, after the solution is agitated, dried, and calcined, preparing a carrier that includes alkali metal and Al, or alkali earth metal and Al, precipitating the carrier that includes the alkali metal and Al, or alkali earth metal and Al with alkali metal, alkali earth metal or rare earth element, and one or more noble metals that are selected from the group consisting of Pt, Pd, and Rh, and drying and calcining the precipitate.

According to the above preparation method, the catalyst for NOx storage and reduction that includes a carrier that includes alkali metal and Al, or alkali earth metal and Al, a NOx storage element of alkali metal, alkali earth metal or rare earth element, and one or more noble metals that are selected from the group consisting of Pt, Pd, Ru, Ag, Au and Rh may be prepared.

In this case, the carrier that includes alkali metal and Al, or alkali earth metal and Al may be prepared by calcining at the temperature of 500 to 800° C. for 3 to 8 hours, and more preferably calcining at the temperature of 600 to 700° C. for 4 to 5 hours. In addition, the carrier that is prepared as described above may prepare finally the NSR catalyst through precipitating with alkali metal, alkali earth metal or rare earth element, and one or more noble metals that are selected from the group consisting of Pt, Pd and Rh, and drying and calcining the precipitate.

Meanwhile, the calcining the dried precipitate may be performed by calcining it at the temperature of 400 to 600° C. for 3 to 6 hours, and in order to optimize the activity of the finally formed catalyst, more preferably calcining it at the temperature of 400 to 500° C. for 4 to 5 hours.

The NSR catalyst that is prepared in the above condition, as described above, has excellent NOx reduction ability and excellent resistance to sulfur at the low temperature condition of around 200° C.

In addition, the kind of the storage element, the kind of noble metal, the contents of the carrier, noble metal and storage element, and Formulas in the catalyst that is prepared according to the above method are the same as those of the NSR catalyst according to various aspects of the present invention.

Meanwhile, other aspects of the present invention provide a NOx removing system that includes other NSR catalysts, or the NSR catalyst that is prepared according to the above preparation method. In detail, a NOx removing system that removes NOx that is included in exhaust gas by using a exhaust device that is installed in a exhaust pipe includes an injector that is installed in the exhaust pipe or engine to further spray a fuel, a diesel fuel decomposition catalyst that is installed in the exhaust pipe at a rear stage of the injector and converts fuel that is further injected into a reducing agent that has high reactivity through thermal decomposition, a NOx removing catalyst system that is installed in the exhaust pipe at a rear stage of the diesel fuel decomposition catalyst such that NOx included in the exhaust gas is stored and reduces NOx through an oxidation-reduction reaction with a reducing agent that has high reactivity by detaching NOx that is stored by fuel that is further injected and includes a kind of catalyst among the catalysts for NOx storage and reduction, and a controller that controls further injection of the fuel according to the operation condition of the engine.

In this case, the NOx removing catalyst system may further include a zeolite catalyst or a catalyst that includes porous alumina carrier, NOx storage elements of alkali metal, alkali earth metal or rare earth element, and one or more metals that are selected from the group consisting of Pt, Pd, Rh, Ir, Ru, W, Cr, Mn, Fe, Co, Cu and Zn. In this case, the zeolite catalyst that is further included or the catalyst that includes a porous alumina carrier may be disposed to approach the exhaust gas, and reduces a portion of NOx that is included in the exhaust gas by the oxidation-reduction reaction with fuel that is not combusted or the hydrocarbon that is included in the exhaust gas, and transmits a portion of remaining NOx to the NSR catalyst that includes the carrier of alkali metal and Al or alkali earth metal and Al through the diffusion.

Meanwhile, NOx that is transmitted through the diffusion is stored in the NSR catalyst that includes the carrier of alkali metal and Al or alkali earth metal and Al, and the stored NOx is detached and reduced, thus removed by fuel that is further sprayed according to a predetermined cycle.

In addition, the configuration of the zeolite catalyst that may be further include is not limited as long as it is the zeolite catalyst that is commercially used as the NOx storage and reduction catalyst, but may be a zeolite catalyst that is ion exchanged with one or more elements that are selected from the group consisting of Cu, Pt, Mn, Fe, Co, Ni, Zn, Au, Ce and Ga. As described above, the zeolite catalyst that is ion exchanged with the element such as Cu may be used particularly in that hydrocarbon (HC) that is the high reactivity reducing agent that is generated by injecting it by the secondary injection system is reacted with NOx to more advantageously adsorb HC in order to advantageously remove NOx.

In addition, the NOx removing system according to various aspects of the present invention may further include a filter for removing a particulate matter that is generated because of a lean-burn. The filter for removing the particulate matter is commercially used, and a configuration thereof is not limited.

Meanwhile, the exhaust pipe of the NOx removing system may be a exhaust pipe of diesel engine that has the compression ratio of 17 or less. By applying the NOx removing system to the exhaust pipe of the diesel engine, NOx may be more efficiently removed, particularly, the reduction ability is excellent at a low temperature, and a NOx removing ability deterioration phenomenon before and after the sulfation is relieved, such that it may be usefully applied to vehicles and the like that are provided with the diesel engine.

According to various aspects of the present invention, the catalyst for NOx storage and reduction shows excellent NOx storage and reduction abilities, excellent storage and reduction abilities before and after deterioration and sulfation, and excellent activity, in particular, under low temperature environment.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

EXAMPLE

Preparation of NSR Catalyst Including Carrier of Alkali Metal and Al

Example 1

Preparation of the Catalyst of 1Pt/10K/Li—Al

In order to prepare the carrier that included Li and Al, after 37.76 g of $LiOH.H_2O$ and 5.087 g of $Na_2CO_3$ that were the precursors of Li and Al were dissolved in 600 ml of water, 250 ml of $Al(NO_3)_3.9H_2O$ that was the precipitation agent was added by the appropriate method, stirred at 75° C. for 12 to 18 hours, and dried at 110° C. for 10 to 15 hours, and the catalyst was calcined at 700° C. for 5 to 8 hours. In respects to the total catalyst weight, it was precipitated in the weight ratio of potassium of 10 wt %, dried at 110° C. for 10 to 15 hours, and calcined at 500° C. for 5 hours, and in respects to the catalyst entire weight, it was impregnated with 1 wt % of Pt, thereby synthesizing it.

Meanwhile, it could be confirmed that the carrier that included Li and Al and was provided in Example 1 had the layered double hydroxides structure through the X-ray diffraction analysis.

Example 2

Preparation of 0.5 Pt, 0.5 Pd/10K/Li—Al

The catalyst was prepared by using the same method as Example 1, except that 0.5 w % of Pt and 0.5 w % of Pd were used instead of 1 wt % of Pt in Example 1.

Example 3

Preparation of 1Pd/10K/Li—Al

The catalyst was prepared by using the same method as Example 1, except that 1 w % of Pd was used instead of 1 wt % of Pt in Example 1.

COMPARATIVE EXAMPLE

Preparation of NSR Catalyst with Alumina as Carrier

Comparative Example 1

Preparation of the Catalyst of 1Pt/20K/$Al_2O_3$

In respects to the total weight of the finally prepared catalyst, 20 wt % of K (potassium) was carried in $Al_2O_3$ that was the carrier by the wet impregnation method, and calcined at 500° C. for 5 hours. In addition, in respects to the total weight of the finally prepared catalyst, 1 wt % of Pt was carried in the calcining material that included the carrier and K by the same method, dried at 110° C. for 10 to 15 hours, and calcined at 500° C. for 5 to 8 hours.

Comparative Example 2

Preparation of 0.5 Pt, 0.5 Pd/20K/$Al_2O_3$

The catalyst was prepared by using the same method as Example 1, except that 0.5 w % of Pt and 0.5 w % of Pd were used instead of 1 wt % of Pt in Comparative Example 1.

Comparative Example 3

Preparation of 1Pd/20K/$Al_2O_3$

The catalyst was prepared by using the same method as Comparative Example 1, except that 1 w % of Pd was used instead of 1 wt % of Pt in Comparative Example 1.

Experimental Example

As described above, in order to test the performances of the NSR catalysts that had the different carriers according to Examples and Comparative Examples, the following test was performed.

1. TPR(Temperature Programmed Reduction) Test

While the temperature was increased, the NOx reduction test was performed under the following condition. First, the amount of catalyst was 100 mg, the entire flow rate was 30 cc/min, and the ratio of the reaction gas and the reference gas that were injected to the gas chromatography (GC) for analysis was 1:1. The catalyst was pre-treated at 500° C. for 1 hour with 5% $H_2$/Ar, and oxidized at 500° C. for 1 hour with air. Under the air atmosphere, after the catalyst was cooled at room temperature, oxygen molecules that were physically adsorbed onto the catalyst and the reactor were removed with 5% $H_2$/Ar for 1 to 2 hours. Thereafter, while the temperature was increased from the room temperature to 800° C. at the rate of 10° C./min, the amount of $H_2$ that was consumed by the catalyst was measured.

The analysis result is shown in FIG. 1. As shown in FIG. 1, in the case of the catalyst of Example that included the carrier that included Li and Al, it was confirmed that the peak that was generated in the high temperature region of about 640° C. was caused by K (potassium) as compared to the 10% K/Li—Al catalyst. The catalyst that included $Al_2O_3$ as the carrier generated the slightly broad peak at around 530° C., which was caused by K (potassium) as compared to the 20% K/$Al_2O_3$ catalyst result. The peak intensity of the K/$Al_2O_3$ catalysts decreased significantly if the catalyst was impregnated with noble metal.

In the case of the peak in the low temperature region, it could be confirmed that there was a difference between the Li—Al-based catalysts that included the noble metal and the $Al_2O_3$-based catalysts. The catalyst of Example 1 (1% Pt/10% K/Li—Al) showed the relatively smooth peak at around 270° C., and the catalyst of Comparative Example 1 (1% Pt/20% K/$Al_2O_3$) showed the slightly small two peaks at around 260° C. and 350° C. It was confirmed that the catalyst of Example 2 (0.5% Pt-0.5% Pd/10% K/Li—Al) generated the $H_2$ reduction peak at around 120° C., and the catalyst of Comparative Example 2 (0.5% Pt-0.5% Pd/20% K/$Al_2O_3$) generated the peak at around 165° C. Since the difference between the temperatures at which the maximum peaks of the catalysts that had the best excellent activity generated was about 50° C., it could be seen that the difference between redox properties of the catalysts was one of the factors responsible for the activity difference.

2. $SO_2$ Adsorbability Test

Under wet conditions, while $SO_2$ was adsorbed onto the catalyst according to both Example 2 and Comparative Example 2 in order to confirm the sulfur species formed on the catalyst surface, the following test was performed.

The SOx adsorption species formed on the catalyst surface was confirmed, after the adsorption with 100 ppm of $SO_2$, 8% of $O_2$, 10% of $H_2O$, and He balance at 200° C. for 30 min.

The sulfur compound formed on the catalyst surface was measured with an in-situ FTIR (MIDAC Corporation). The sulfur compound that was measured per hour and formed on the catalyst surface is shown in FIG. 2.

As shown in FIG. 2, in the case of two catalysts [a of FIG. 2 is the result for the catalyst of Example 2 (0.5Pt-0.5Pd/10K/Li—Al), and b of FIG. 2 is the result for Comparative Example 2 (0.5Pt-0.5Pd/20K/Al2O3)], the formation of the surface $K_2SO_4$ at ca. 1,100 $cm^{-1}$ that was the peak by the K (potassium) on the catalyst was observed, and the bulk $K_2SO_4$ was confirmed at ca. 1,160 $cm^{-1}$. In addition, surface $Al_2(SO_3)_3$ at ca. 970 $cm^{-1}$ and surface $Al_2(SO_4)_3$ at ca. 1,330 $cm^{-1}$ were confirmed, and it was observed that the $OH^-$ peak was formed on the catalyst by water at ca. 1,580 $cm^{-1}$.

As shown in FIG. 2, as compared to the catalyst of Comparative Example 2 that included $Al_2O_3$ as the carrier, the $K_2SO_4$ generation speed was slow on the catalyst of Example 2 that included the Li and Al-based carrier.

3. Analysis of NOx Adsorption Amount Before and after Sulfation

At 200° C., after 100 ppm of $SO_2$ flew for 30 min to implement sulfation, the nitrogen compound that was formed after the adsorption of NOx was measured with an FTIR (MIDAC corporation), which is shown in FIG. 3.

In detail, the adsorption of NOx was performed with 1000 ppm of NO, 8% of $O_2$, 10% of $H_2O$, and He balance condition for 30 min.

Meanwhile, as shown in FIG. 3, the change of NOx adsorption species that were formed on the catalyst surface before and after exposure to $SO_2$ was confirmed. NO was adsorbed at 200° C. with 1,000 ppm of NO, 8% of $O_2$, and 10% $H_2O$ condition for 30 min, and completely reduced with 0.5% of $H_2$, $SO_2$ was adsorbed with 100 ppm of $SO_2$, 8% of $O_2$, 10% of $H_2O$ condition for 30 min, and NO was readsorbed under the same condition, so that the changes of NOx adsorption species formed on the catalyst due to $SO_2$ were compared. The measurement was performed at the interval of 1, 3, 5, 7, 10, 20, and 30 min, the main peak by bridged bidentate nitrite was observed at ca. 1240 $cm^{-1}$, monodentate nitrate that was caused by K (potassium) was confirmed at ca. 1330 $cm^{-1}$, and the formation of the chelating bidentate nitrate was seen at IR peak, ca. 1550 $cm^{-1}$. That is, if NO adsorption processes before and after exposure to $SO_2$ for 30 min are compared, in the catalyst of Example 2 (0.5% Pt-0.5% Pd/10% K/Li—Al), it could be confirmed that the intensity of generation peak of bridged bidentate nitrite that was the main adsorption species was lowered by 19% after exposure to $SO_2$.

In order to confirm the change of the NOx adsorption species before and after exposure to $SO_2$ of the catalyst of Comparative Example 2 (0.5% Pt-0.5% Pd/20% K/$Al_2O_3$), the test was performed under the same condition as the Li—Al-based catalyst, and the same species as NOx adsorption species were generated. In the $Al_2O_3$-based catalyst, the peak intensity of the bridged bidentate nitrite formation due to exposure to $SO_2$ was decreased by 37% as compared to the case no exposure to $SO_2$ (i.e., prior to $SO_2$ exposure.)

4. Hydrophilicity Analysis of Catalyst

The resistance to sulfur relates to the hydrophilicity of the catalyst, and $OH^-$ from $H_2O$ that is included in the reaction gas mixture increases the oxidizability of $SO_2$, such that the formation of $K_2SO_4$ is accelerated. In this sense, the hydrophobicity of the catalyst is very important.

Meanwhile, in order to analyze the hydrophilicity of the NSR catalyst according to Example 2 and Comparative Example 2, the temperature programmed desorption (TPD) of $H_2O$ was performed under the following condition.

Water was bubbled with a predetermined gas partial pressure at 46° C., and the test was performed by using Ar as the balance gas. The total flow rate of the reaction gas mixture was 100 cc/min. After 0.1 g of sample was charged into the U-type quartz tube reactor, and pre-treated under the 5% $H_2$/Ar condition at 500° C. for 1 hour, the temperature was decreased to 200° C., and water was adsorbed with 8% of $O_2$, 10% of $H_2O$, 5% of $CO_2$, and Ar balance for 30 min. In order to remove water that was physically adsorbed onto the catalyst and water components that remained in the reactor, the temperature was lowered to room temperature, purging was performed with Ar for 30 min, the temperature was increased at the rate of 10° C./min, and the amount of water that was desorbed from the catalyst was measured at mass number 17 and 18 by an on-line mass spectrometer.

As shown in FIG. 4, in the case of the $Al_2O_3$-based catalyst of Comparative Example 2, it could be seen that the adsorbed $H_2O$ started to desorb at around 260° C., and all adsorbed $H_2O$ desorbed at around 490° C. In the case of the Li—Al-based catalyst, it could be observed that the adsorbed $H_2O$ started to desorb at around 330° C., and all adsorbed $H_2O$ desorbed at around 400° C. In addition, through the comparison of area and intensity of the desorption peak, it could be confirmed that the amount of $H_2O$ that was adsorbed on the Li—Al-based catalyst was much less than that on the $Al_2O_3$-based catalyst. Through the confirmation of the hydrophobicity of the Li—Al-based catalyst through $H_2O$ TPD, it could be seen that the Li—Al-based catalyst of Example 2 was less affected by $OH^-$ from water at the time of adsorbing $SO_2$ because of the hydrophobicity of the surface thereof.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A NOx removing system that removes NOx that is included in an exhaust gas by using an exhaust device that is installed in an exhaust pipe comprising:
   an injector that is installed in the exhaust pipe or an engine to spray a fuel;
   a diesel fuel decomposition catalyst that is installed in the exhaust pipe at a rear stage of the injector and converts a fuel that is further injected into a reducing agent that has high reactivity through thermal decomposition;
   a NOx removing catalyst system that is installed in the exhaust pipe at a rear stage of the diesel fuel decomposition catalyst such that the NOx included in the exhaust gas is stored and reduces the NOx through an oxidation-reduction reaction with a reducing agent that has high reactivity by desorbing the NOx that is stored by fuel that is further injected and includes a kind of catalyst among catalysts for NOx storage and reduction wherein the catalysts for the NOx storage and reduction include a carrier including alkali metal and Al, or alkali earth metal and Al, a NOx storage element of alkali metal, alkali earth metal or rare earth element, and one or more noble metals that are selected from the group consisting of Pt, Pd, Ru, Ag, Au and Rh; and
   a controller that controls further injection of the fuel according to an operation condition of the engine,
   wherein the carrier has a structure of layered double hydroxides that is represented by the following Formula:

wherein, Z is Li, Na, K, Rb, Cs, Fr, Be, Mg, Ca, Sr, Ba, or Ra;
   X is $Cl^-$, $Br^-$, $NO_3^-$, $CO_2^{-3}$ or $SO_2^{-4}$; and
   y is a rational number in the range of 0.5 to 4.

2. The system of claim 1, wherein:
   the NOx removing catalyst system further includes a zeolite catalyst or a catalyst that includes porous alumina carrier;
   NOx storage elements of alkali metal, alkali earth metal or rare earth element; and
   one or more noble metals that are selected from the group consisting of Pt, Pd, Rh, Ir, Ru, W, Cr, Mn, Fe, Co, Cu and Zn.

3. The system of claim 2, wherein:
the zeolite catalyst is ion exchanged by one or more elements that are selected from the group consisting of Cu, Pt, Mn, Fe, Co, Ni, Zn, Au, Ce and Ga.

4. The system of claim 1, wherein:
the exhaust pipe is an exhaust pipe of a diesel engine in which a compression ratio is 17 or less.

\* \* \* \* \*